United States Patent [19]

Goryaev et al.

[11] 4,007,284
[45] Feb. 8, 1977

[54] PROCESS FOR MANUFACTURING A FATTY CONCENTRATE

[76] Inventors: Mikhail Ivanovich Goryaev, ulitsa M. Gorkogo, 60, kv. 15; Antonina Demidovna Ulyanova, ulitsa Masanchi, 56, kv. 11; Reingold Georgievich Maier, 11 mikroraion, 28, kv. 92; Vadim Nikolaevich Startsev, Krasnogvardeisky trakt, 263/16, kv. 2, all of Alma-Ata, U.S.S.R.

[22] Filed: June 20, 1975

[21] Appl. No.: 588,955

[30] Foreign Application Priority Data

June 28, 1974 U.S.S.R. .............................. 2040319
July 1, 1974 U.S.S.R. .............................. 2039910

[52] U.S. Cl. .................................. 426/98; 426/609;
426/647; 426/655; 426/658; 426/807
[51] Int. Cl.² .................... A23D 5/04; A23D 5/02
[58] Field of Search ............ 426/98, 321, 609, 647, 426/655, 658

[56] References Cited

UNITED STATES PATENTS

| | | | |
|---|---|---|---|
| 2,913,342 | 11/1959 | Cameron et al. | 426/609 X |
| 2,954,297 | 9/1960 | Elsesser et al. | 426/98 |
| 3,295,986 | 1/1967 | Saslaw et al. | 426/609 X |
| 3,330,667 | 7/1967 | Tressler | 426/609 X |
| 3,560,220 | 2/1971 | Bangert et al. | 426/609 |

*Primary Examiner*—Jeanette M. Hunter

[57] ABSTRACT

Manufacturing a fatty concentrate by emulsifying vegetable or animal fat heated to a temperature between 20° and 40° C in the medium of a protein or carbohydrate adsorbent. The adsorbent used serves to build up a protective coating on the particles of the fat being emulsified. The fat emulsion with the adsorbent is subjected to drying.

9 Claims, No Drawings

PROCESS FOR MANUFACTURING A FATTY CONCENTRATE

The present invention relates to the mixed feed industry; more specifically, it is directed to processes for manufacturing a fatty concentrate.

The invention may find application for manufacturing concentrated feeds for feeding animals and poultry. In addition, the invention may be utilized in the food industry, for instance, in bread baking and in the manufacture of sausages.

It is common knowledge that fats improve the calorie value of mixed feeds. Currently animal fats of acidity not exceeding 20° are utilized in mixed feeds. Said fats are added to the feeds by heating them to the melting point and dispersing the molten fats with the aid of an atomizer in the bulk of the feed.

The feed containing such a fat, however, cannot be stored longer than 10 days, for the fat oxidizes, rendering the feed toxic.

There exist processes for the production of mixed feeds containing fats and intended for prolonged storage.

Thus, it is known in the art to produce dry cream in a procedure which comprises homogenizing cream by dewatering the same at elevated temperature and subsequently drying the dewatered cream.

However, said known technique can hardly be recommended for processing animal fats as it does not safeguard fats against oxidation.

It is an object of the present invention to obviate the foregoing disadvantages.

It is a cardinal object of the present invention to provide a process for producing a fatty concentrate capable of withstanding prolonged storage.

Accordingly, there is provided a process for manufacturing a fatty concentrate, wherein, in accordance with the invention, animal or vegetable fat heated to a temperature of from 20° to 40° C. is emulsified in the medium of a protein or carbohydrate adsorbent enveloping the fat particles in a protective coating, said components being taken in the ratio of 1 to 2–10, respectively, after which the fat emulsion with the adsorbent is subjected to drying.

The foregoing object is attained by the provision of a process for manufacturing a fatty concentrate, wherein, in accordance with the invention, animal or vegetable fat heated to a temperature of from 20° to 40° C. is emulsified in a protein or carbohydrate adsorbent which envelops the fat particles in a protective coating, said components being taken in the ratio of 1 to 2–10, respectively, after which the fat emulsion with the adsorbent is subjected to drying.

The proposed process produces a fatty concentrate capable of withstanding storage for more than 6 months.

Besides, the protein or carbohydrate coating on the fatty paticles adds to the calorie value of the concentrate.

In accordance with the present invention, the heated fat is preferably emulsified in the presence of surface-active substances, viz. monoglycerides of fatty acids. With the emulsification procedure being effected in the presence of surfactants, the process of formation of the protective coating on the particles of emulsified fat proceeds much faster.

It is further preferred that the heated fat should be emulsified in the presence of a stabilizer, viz. trisodium pyrophosphate. Emulsification in the presence of said stabilizer permits employing fats of acid number from 1° to 20° and higher.

An alternative embodiment of the present invention consists in emulsifying the heated fat in a medium including coarse meal utilized as the carbohydrate adsorbent, said components being taken in the ratio of 1 to 2–3, respectively.

The coarse meal adsorbent makes for the formation of a carbohydrate envelope around the fat globules, permitting the product fatty concentrate to withstand more than 6 months' storage.

Yet another embodiment of the present invention envisages emulsifying the heated fat in whole or defibrinated animal blood utilized as the protein adsorbent, said components being taken in the ratio of 1 to 5–10, respectively.

The whole or defibrinated animal blood adsorbent conduces to a protein coating on the surface of the fat globules, permitting the product fatty concentrate to withstand prolonged storage and improving its food value.

Still another embodiment of the present invention comprises emulsifying the heated fat in meat broth utilized as the protein adsorbent, said components being taken in the ratio of 1 to 5–10, respectively.

The meat broth adsorbent conduces to a protein coating on the surface of the fat particles, imparting improved storageability to the product fatty concentrate and raising its food value.

The proposed invention makes it possible to utilize waste products of meat-packing plants.

A further embodiment of the present invention provides for emulsifying the heated fat in meat broth and mixing it with whole or defibrinated animal blood, said components being taken in the ratio of 1 to 3 to 3–4, respectively.

The meat broth-and whole of defibrinated animal blood adsorbent conduces to a protein coating on the surface of the fat particles, imparting improved storageability of the product fatty concentrate and raising its food value.

Further objects and advantages of the present invention will become apparent from the following detailed description of the proposed process for manufacturing a fatty concentrate illustrated by exemplary embodiments thereof.

The process for manufacturing a fatty concentrate, in accordance with the present invention, provides for the possibility of utilizing both animal fat, e.g. beef, hog or bone fat, and vegetable fat, e.g sunflower oil or cottonseed oil.

We have discovered that the animal or vegetable fat heated to a temperature of from 20° to 40° C., i.e. to the melting point of animal fats at which the vegetable fat retains low viscosity, must be emulsified in a protein or carbohydrate adsorbent.

Emulsification is known to be a process of producing a suspension of fat particles in water.

We propose that emulsification of e.g. animal fat be effected in an ultrasonic disperser, wherein fat particles of an optimal size may be obtained, the particle size of the fat being dispersed depending on the designation of the fatty concentrate (thus, if the product fatty concentrate is earmarked for producing poultry feeds, the particle size of the concentrate shall not exceed 10 microns). Besides, the particle size of the fat being dispersed by and large determines whether such particles can be enveloped in a protective protein or carbohydrate shell.

We have further found that, if a stable non-stratifying fat emulsion is to be produced, the feedstock fat must be emulsified in the presence of surface-active agents, viz. monoglycerides of fatty acids, e.g. monoglycerides of stearic acid, monoglycerides of palmitic acid, or monoglycerides of oleic acid.

Besides, we have found that fat emulsification is preferably effected in the presence of a stabilizer. If a fat of acid number in excess of 20° is employed as the starting material, it is necessary to stabilize the fat and bring it to an acid number of 20°, making it fit for consumption by animals and poultry. Trisodium pyrophosphate is precisely such a stabilizer, as proved by our investigations.

Said compound is not toxic; it contains phosphorus, a paramount element for a normally developing organism; and it is an effective fat stabilizer.

In accordance with the present invention, the animal or vegetable fat heated to 40° C is emulsified in a protein or carbohydrate adsorbent, the latter conducing to a protective coating forming on the fat particles.

We propose to utilize as the carbohydrate adsorbent the product of grain milling, viz. fine meal powder.

The reason for choosing this particular product should be sought in its ability to form an effective impenetrable coating on the surface of the fat particles and to securely protect the fat from oxidation.

We have found that the emulsification procedure in a medium including fine meal powder is desirably effected at a ratio of said components of 1 to 2–3, respectively.

Said ratio conduces to a fatty concentrate wherein each dispersed fat particle is enveloped in a secure protective carbohydrate shell.

We have further determined the desirability of employing protein adsorbents, such as whole or defibrinated animal blood or meat broth, a waste product of meat-packing plants produced in bone boiling and sausage making. The protein adsorbent conduces to a protective protein coating safeguarding the fat against oxidation and adding fat and protein to the product concentrate, which improves the food value and calorie value of the concentrate and gives it improved storageability.

We have found that the fat emulsification procedure should be effected in whole or defibrinated animal blood or in meat broth at a desirable ratio of said components of 1 to 5–10, respectively. Fat emulsification in meat broth followed by mixing same with whole or defibrinated blood is preferably effected at a ratio of the components of 1 to 3 to 3–4, respectively. The latter ratio makes it possible to produce a fatty concentrate containing from 30 to 70 percent of fat and from 60 to 20 percent of proteins, each dispersed fat particle being provided with a secure protein envelope.

The fat emulsion with the adsorbent is then dried, e.g. in a spray or drum dryer.

The end product is a dry powder-like fatty concentrate exhibiting attractive physico-chemical properties: it has a pleasant small and colour; shows no tendency to cake or form lumps in storage; and is readily proportioned while being incorporated into mixed feeds.

EXAMPLE 1

7 kg of industrial animal fat of acidity 7.5° is heated to 40° C and, in the presence of a mixture of monoglycerides of palmitic, stearic and oleic acids, charged into an ultrasonic disperser. Simultaneously the disperser is charged with 10 kg of water with coarse meal. The emulsion produced in the ultrasonic disperser is subjected to drying in a unit wherein the drying agent has an inlet temperature of 160° C. and an outlet temperature of 60° C.

Analysis of the end product indicates that 99.3 percent by weight of the fat particles in the fatty concentrate are completely enveloped in a carbohydrate shell.

Chemical analysis of the end product shows that it comprises 38% fat, 57.5% carbohydrate coating and 4.5% moisture.

The fatty concentrate obtained in the process is a dry powder-like product with a pleasant smell, good friability and high storageability. The mechanical properties of the fatty concentrate are such that it may be proportioned and mixed with other ingredients of mixed feeds.

EXAMPLE 2

4 kg of industrial animal fat of acidity 22° is heated to a temperature of 40° C., mixed with monoglycerides produced from bone fat, and emulsified in the chamber of an ultrasonic disperser for 3 minutes in an aqueous medium of coarse meal (containing 8 kg of coarse meal) to produce a water-fat emulsion. The emulsion thus produced is charged into a dryer. The end product, viz. fatty concentrate, comprises 39.8% fat, 55.7% carbohydrate coating and 4.5% moisture.

Thanks to its protective carbohydrate adsorbent coating, the animal fat is capable of withstanding 6 months' storage.

EXAMPLE 3

1 kg of sunflower oil of acidity 18° is admixed at room temperature with 3 g of a mixture of monoglycerides of aliphatic acids, the mixture thus produced is emulsified in an aqueous medium containing 3 kg of coarse meal, and then dried in a dryer. In the end product, 99.1 percent by weight of fat particles have protective carbohydrate coatings.

EXAMPLE 4

4 kg of industrial animal fat of acidity 20° is heated to a temperature of 40° C., admixed with 0.012 kg of monoglycerides of aliphatic acids and charged into an ultrasonic disperser which is simultaneously charged with whole blood. Said components are emulsified for 6 to 8 minutes. The resultant emulsion is dried in a unit wherein the drying agent has an inlet temperature of 150° C. and an outlet temperature of 70° C.

The product fatty concentrate has a pleasant smell, a cocoa color, good friability, high resistance to caking and an ability to withstand storage of up to 6 months.

Analysis of the end product indicates that the fatty concentrate contains 60% fat, 35% dry blood protein and 5% moisture.

EXAMPLE 5

304 kg of industrial animal fat of acidity 28° is heated to 40° C., admixed with stirring with 3 kg of sodium pyrophosphate and charged into an ultrasonic disperser which is simultaneously charged with 3,200 kg of difibrinated blood. The mixture is kept in the disperser for 3 to 5 minutes, a period sufficient to produce an emulsion. The emulsion is charged into a dryer.

In the product fatty concentrate, 99.3 percent by weight of fat particles have protective protein coatings.

EXAMPLE 6

600 kg of industrial animal fat of acidity 31° is heated to a temperature of 40° C., admixed with stirring with 4.5 kg of trisodium pyrophosphate and charged into an ultrasonic disperser which is simultaneously charged with 3,300 kg of whole animal blood. The emulsion obtained in said disperser is dried in a dryer. In the product fatty concentrate, 99.5 percent by weight of fat particles have protective protein coatings.

EXAMPLE 7

516 kg of industrial animal fat of acidity 40.5° is heated to a temperature of 40° C., admixed with 5 kg of trisodium pyrophosphate and charged into an ultrasonic disperser which is simultaneously charged with difibrinated animal blood. The emulsion produced in the disperser is dried in a unit wherein the inlet temperature is 150° C. and the outlet temperature is 65° C.

In the product fatty concentrate, 99.4 percent by weight of fat particles have protective protein coatings.

EXAMPLE 8

660 kg of industrial animal fat of acidity 25° is heated to 40° C., charged into an ultrasonic disperser and emulsified therein in the presence of 7.5 kg of trisodium pyrophosphate. Simultaneously the ultrasonic disperser is charged with 5,300 kg of meat broth produced in the bone boiling and sausage making processes at a meat-packing plant, said meat broth containing up to 40 percent protein (dry). The emulsion produced in the disperser is dried in a dryer.

The end product contains 50% fat, 45% protein and 4.5% moisture. The fatty concentrate has a pleasant smell, a cocoa color, excellent friability; it can be readily proportioned.

EXAMPLE 9

520 kg of beef fat of acidity 23° is heated to a temperature of 40° C. and emulsified in the presence of 4 kg of trisodium pyrophosphate and 3,725 kg of meat broth. The emulsion thus produced is dried in a dryer. In the product fatty concentrate, 99.2 percent by weight of fat particles have protective protein coatings.

EXAMPLE 10

509 kg of industrial animal fat of acidity 21° is heated to a temperature of 40° C. and emulsified in the presence of 3.5 kg of trisodium pyrophosphate. Simultaneously, 2,000 kg of meat broth is supplied into the ultrasonic disperser wherein the emulsification procedure is effected. The emulsion produced is admixed with whole animal blood and subjected to drying.

In the product fatty concentrate, 99.5 percent by weight of fat particles have protective protein coatings.

EXAMPLE 11

790 kg of mutton fat of acidity 18° is heated to a temperature of 40° C. and charged into an ultrasonic disperser which is simultaneously charged with 2,000 kg of meat broth and 4 kg of trisodium pyrophosphate. The emulsion thus produced is admixed with defibrinated animal blood and subjected to drying.

The product fatty concentrate contains 62% fat, 33.2% protein and 4.8% moisture.

What is claimed is:

1. A process for manufacturing a fatty concentrate, which comprises heating a fat selected from the group consisting of animal and vegetable fats to a temperature of from 20° to 40° C.; emulsifying said heated fat in the medium of an adsorbent selected from the group consisting of protein and carbohydrate adsorbents, said protein adsorbents selected from whole animal blood, defibrinated animal blood and meat broth, said carbohydrate adsorbent is meal and forming a protective coating on the particles of the fat being emulsified, said components being taken in the ratio of 1 fat to from 2 to 10 adsorbent; and drying the thus produced fat emulsion containing said adsorbent.

2. A process for manufacturing a fatty concentrate as claimed in claim 1, wherein the heated fat is emulsified in the presence of a stabilizer.

3. A process for manufacturing a fatty concentrate as claimed in claim 1, wherein the heated fat is emulsified in the presence of surface-active substances.

4. A process for manufacturing a fatty concentrate as claimed in claim 1, wherein the heated fat is emulsified in a medium comprising coarse meal which is employed as the carbohydrate adsorbent, said components being taken in the ratio of 1 fat to from 2 to 3 adsorbent.

5. A process for manufacturing a fatty concentrate as claimed in claim 1, wherein the heated fat is emulsified in the medium of animal blood employed as the protein adsorbent, said components being taken in the ratio of 1 fat to from 5 to 10 blood.

6. A process for manufacturing a fatty concentrate as claimed in claim 1, wherein the heated fat is emulsified in the medium of meat broth employed as the protein adsorbent, said components being taken in the ratio of 1 fat to from 5 to 10 meat broth.

7. A process for manufacturing a fatty concentrate as claimed in claim 1, wherein the emulsion of fat in meat broth is admixed with animal blood, said components being taken in the ratio of 1 fat to 3 meat broth to from 3 to 4 animal blood.

8. A process according to claim 2 wherein the stabilizer is trisodium pyrophosphate.

9. A process according to claim 3 wherein the surface-active substances are monoglycerides of aliphatic acids.

* * * * *